United States Patent [19]
Bilbrey

[11] 3,984,659
[45] Oct. 5, 1976

[54] APPARATUS FOR FEEDING SHEET MATERIAL FROM THE BOTTOM OF A STACK

[75] Inventor: Robert A. Bilbrey, Orinda, Calif.

[73] Assignee: Ball Computer Products, Inc., Sunnyvale, Calif.

[22] Filed: Feb. 10, 1975

[21] Appl. No.: 548,746

Related U.S. Application Data

[62] Division of Ser. No. 251,187, May 8, 1972, Pat. No. 3,874,652.

[52] U.S. Cl. .................. 235/61.11 E; 235/61.11 R; 271/35
[51] Int. Cl.² ...................... B65H 3/04; G06K 7/14; G06K 7/06
[58] Field of Search ............... 271/35, 47, 126, 124; 235/61.11 E, 61.7 B, 61.11 R, 61.11 D; 250/569

[56] References Cited
UNITED STATES PATENTS

| | | |
|---|---|---|
| 798,857 | 9/1905 | Zander ............................ 271/126 |
| 1,596,056 | 8/1926 | Mader ............................. 271/124 |
| 3,414,731 | 12/1968 | Sperry ............................ 250/569 |
| 3,663,800 | 5/1972 | Myer .......................... 235/61.11 E |
| 3,761,688 | 9/1973 | Cassel ........................ 235/61.11 E |
| 3,874,652 | 4/1975 | Bilbrey ............................. 271/35 |

Primary Examiner—Daryl W. Cook
Assistant Examiner—Robert M. Kilgore
Attorney, Agent, or Firm—Limbach, Limbach & Sutton

[57] ABSTRACT

The end of a movable belt adjoins a supporting surface for removing a bottom sheet from a stack of sheets sitting on the supporting surface. A wall structure over the conveyor belt prevents those sheets other than the bottom sheet from being removed from the stack. The sheet supporting surface may be a transparent plate with a document reader located thereunder, thus allowing sheets containing information thereon to be placed face down on the glass plate and optically read automatically before removal by the movable belt.

5 Claims, 8 Drawing Figures

U.S. Patent  Oct. 5, 1976  Sheet 1 of 4  3,984,659
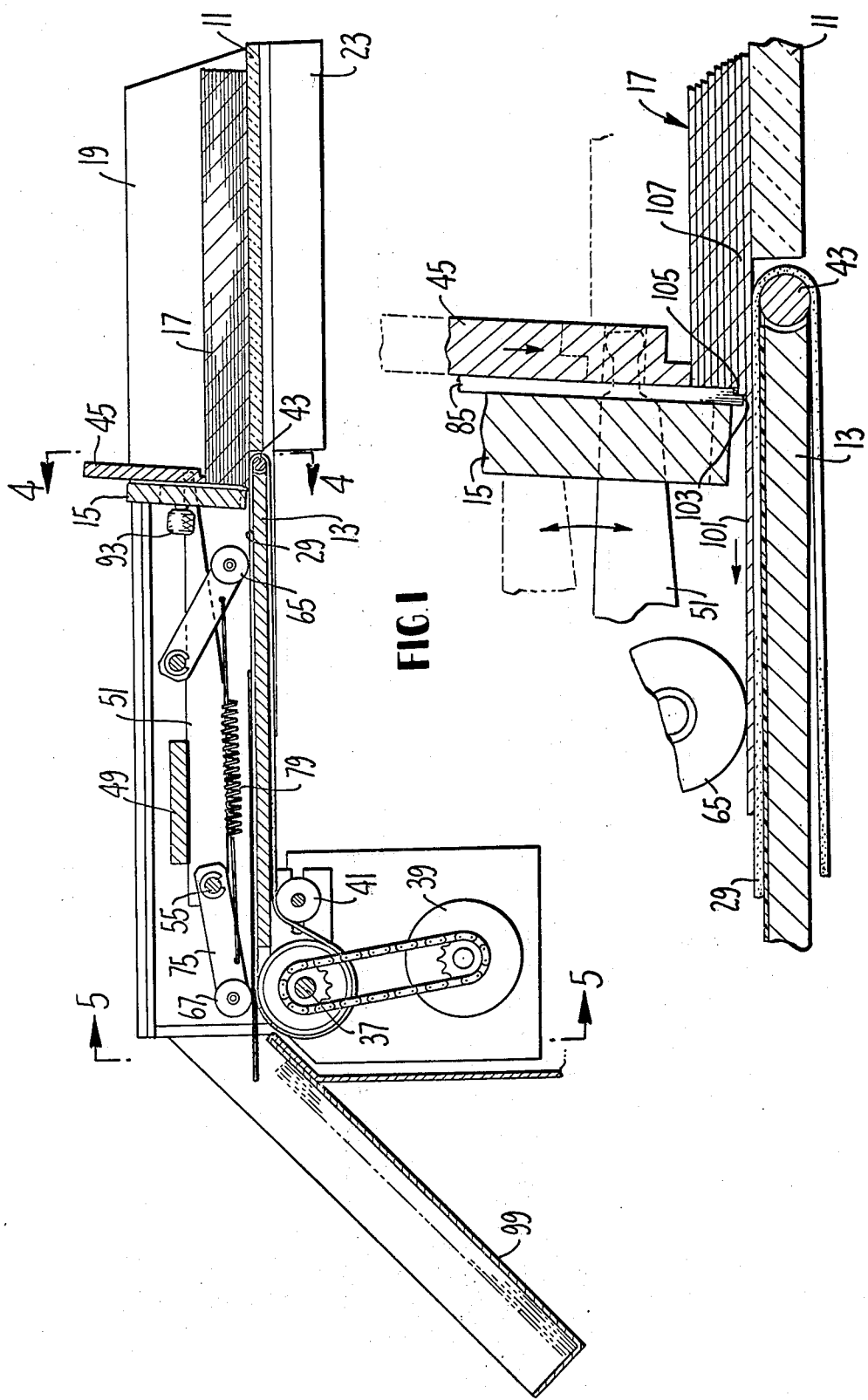

APPARATUS FOR FEEDING SHEET MATERIAL FROM THE BOTTOM OF A STACK

This is a division of application Ser. No. 251,187 filed May 8, 1972, now U.S. Pat. No. 3,874,652.

BACKGROUND OF THE INVENTION

This invention relates generally to sheet feeding mechanisms, and more particularly to sheet feeding mechanisms that extract sheets from the bottom of a stack.

There are many existing types of document reading machines, such as those of the Xerox process and various character recognition systems. For each of these types of devices, it is necessary to accurately position one document at a time for optical reading of the information thereon. For automatic handling of documents, existing mechanisms employ three stations, the first station where the documents are placed face up in a stack, a second station to which the documents are moved one at a time to be optically viewed, and thirdly a station where the optically read documents are collected and stacked. Existing document feeders for this and additional applications are bulky and complicated.

Therefore, it is a primary object of the present invention to provide a document feeder for use with an optical reading device that is simple in operation, compact and reliable.

It is another object of the present invention to provide an improved technique and apparatus for moving sheet material generally.

SUMMARY OF THE INVENTION

Briefly, these and additional objects are realized according to the techniques of the present invention wherein a stack of sheets to be moved one at a time is set on a fixed surface with one edge of the stack sitting on a movable surface, such as the end of a conveyor belt, located adjacent the fixed surface. Operation of the conveyor belt or other movable surface removes the bottom sheet of the stack by frictional engagement therebetween. A wall structure is situated generally vertically above the conveyor belt to stop all sheets of the stack other than the bottom sheet from moving with the conveyor belt. A loader bar is situated adjacent the wall and over the end of the conveyor belt for pushing downward along one edge of a stack of sheets, thus increasing the frictional engagement of the conveyor belt with the bottom sheet. A control mechanism is provided to relieve the downward force of the loader bar after the conveyor belt has operated to remove a bottom sheet of the stack under the wall and into engagement with some other mechanism, such as a resiliently held roller, which holds the sheet to the conveyor belt at a position beyond the wall structure. This prevents the next to the bottom sheet from following on the conveyor immediately behind the bottom sheet just removed. The loader bar is later allowed to exert a downward force on the stack of sheets after the bottom sheet just removed has been conveyed a distance away from the wall.

Although the techniques and apparatus of the present invention have a wide variety of applications for sheet feeding generally, the techniques of the present invention have a particular advantage when used in conjunction with an optical reading device of some type. In this case, the stationary stack supporting surface may be made transparent and an optical reading device positioned underneath the transparent plate for viewing the bottom surface of the bottom document of a stack of documents placed thereon. Certain types of optical readers require the documents to be accurately positioned with respect thereto, and this technique allows careful positioning by an operator who manually stacks documents face down on the glass sheet with their leading edge sitting on the end of the adjacent conveyor belt and against the wall structure. A disadvantage of present machines wherein automatic positioning of a document with respect to an optical reader is subject to error is eliminated. Furthermore, a separate feeding mechanism to the optical reader is unnecessary. The documents may be scanned and read by the optical reader after which the bottom document is removed by the feeding mechanism. This sequence of events is continued until an entire stack of documents has been reviewed. The document feeding mechanism stacks the documents at its output in the same order in which they were presented to the optical reader. By eliminating one station in an optical reading and document feeding combination, the entire operation may be done with a much more compact apparatus than that presently used.

The wall structure adjacent the stack of documents is preferably tilted in a manner to form an angle with the flat document support surface that is a few degrees less than 90°, such as 85°–87° therewith. This prevents the sheets in a stack of sheets from binding against the wall as they drop down onto the supporting surface. The gap between the wall and the top of the conveyor belt is preferably accurately controlled to a magnitude that is slightly larger than the thickness of the sheets being moved thereby. Since the thickness of sheets may vary, it is preferably to provide a mechanism for adjusting the height of this gap such as by providing individually adjustable gates on the wall structure which may be moved up and down with respect thereto and secured in place when the desired gap has been set. These gates can then be made as precision elements. Each gate preferably is relieved at its bottom edge on the surface adjacent the stack of sheets in a manner to form a notch that receives the next to the bottom sheet as the bottom sheet is withdrawn by the conveyor belt underneath the wall structure. The use of such a notch prevents curling of the sheet next in line to be removed from the stack and thus prevents the leading edge of the bottom sheet from snagging on the bottom edge of the gate as the conveyor draws it thereunder. A conveyor belt is preferably supported by a rigid member, such as a Teflon coated metal plate, in order to further accurately define the size of this gap.

There are many ways to adjust the gap between the conveyor belt and the gate, but for persons not intimately familiar with the sheet feeding device, it has been found that a particular technique is highly useful. This technique involves the use of a sample sheet of the thickness that is to be fed by the machine. A gauging material of a certain thickness, such as Mylar having a thickness of 0.001 inch, is folded over one edge of the document sheet. This three layer composite sheet is then positioned between the conveyor belt and the gate and the gate is dropped down to engage this composite sheet and is fastened in such a position. Since the Mylar is slippery, the document sheet in the middle thereof may be easily pulled from underneath the gate after adjustment even though there may be some compressive force thereagainst. Once this document sheet has been removed, the Mylar can be pulled from underneath the gate.

Additional objects and advantages of the various techniques and forms of apparatus according to the present invention are described in the following detailed description which is to be taken in conjunction with the accompanying drawings.

BRIEF DESCRIPTION OF THE DRAWINGS

FIG. 1 is a cross-sectional view taken along a vertical plane through a preferred embodiment of the present invention;

FIG. 2 is an enlarged view of a portion of the embodiment of FIG. 1;

DESCRIPTION OF THE PREFERRED EMBODIMENTS

Figure 3:
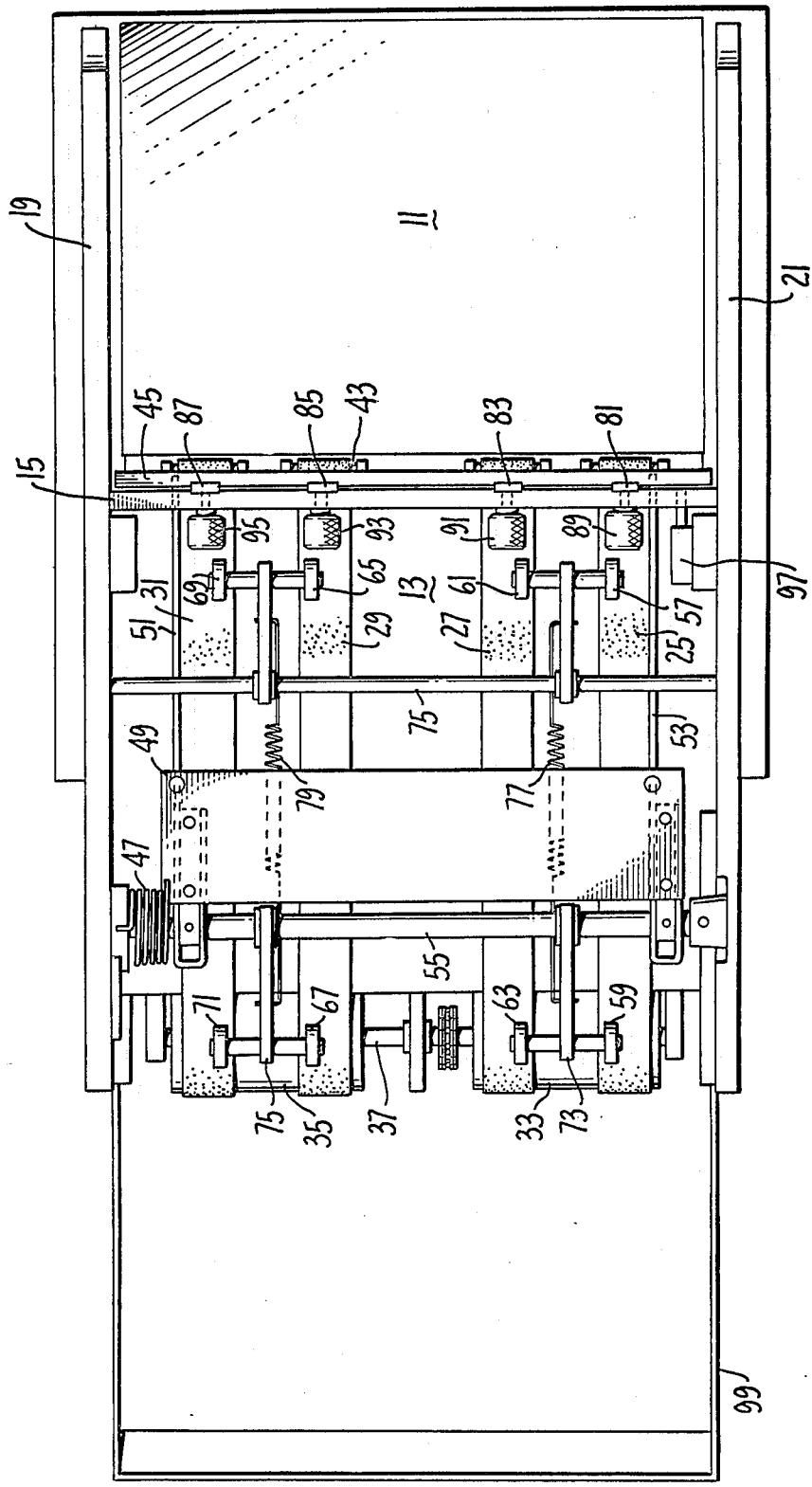
FIG. 3 is a top view of the embodiment of FIG. 1.

Referring primarily to FIGS. 1 and 3, the structure of the preferred embodiment of the present invention in the form of a document feeder is generally described. A stationary planar stack supporting surface element 11 has one end thereof positioned adjacent an end of a conveyor plate 13. A wall structure 15 is positioned above the conveyor support plate 13 and across its width. The wall structure 15 preferably forms an angle of something less than 90° with a top surface of the planar support plate 11 and the conveyor plate 13 on the side of the wall 15 which is contacted by a stack 17 (FIG. 1) of documents to be moved one at a time. Side walls 19 and 21 define, along with the wall structure 15, a surface for supporting a stack of documents. The stack supporting surface includes adjoining portions of the support plate 11 and the conveyor plate 13.

When the document feeder of the present invention is used in conjunction with an optical reader, the stack supporting plate 11 is preferably transparent and made of a material such as glass that may be carefully optically controlled. A document reader 23 is positioned immediately below the glass plate 11 in a manner to be able to read any information carried by the bottom surface of the bottom document of the stack 17 through the glass plate 11. The optical reader 23 may be, for instance, of a type described in a co-pending patent application of Lester J. Lloyd, filed June 28, 1971, Ser. No. 157,348, and entitled "Document Scanner." The optical reader 23 can be synchronized with the document feeder so that as soon as the information on the face down document at the bottom of the stack 11 has been read, the mechanical feeder mechanism will operate to remove that document in order to present the information on the face of the next to the bottom document for recognition or reading by the optical reader 23.

The bottom sheet of the stack 17 is moved underneath the wall structure 15 by frictional engagement with four conveyor belt strips 25, 27, 29 and 31. All four of the belts are driven together, the belts 25 and 27 being driven by a belt drive roll 33 and the belts 29 and 31 being driven by a belt drive roll 35, the two belt drive rolls being connected to a common drive shaft 37. The shaft 37 is rotated by an appropriate chain connection by a motor 39. Tensions on the belts is controlled by an idler tension roller 41 that is positioned under the rigid conveyor plate 13. The motor 39 drives the belts in a direction away from the glass plate 11 for removal of the bottom document from the stack 17. As is explained more fully hereinafter, the motor 39 is operated intermittently in synchronism with other components of the sheet feeding mechanism. The top surface of the rigid belt support plate 13 is treated so that the belts and sheets will slide easily thereover. For instance, the top surface of the plate 13 may be coated with a Teflon material. Each of the belts is held at the end of the plate 13 adjacent the glass plate 11 by an appropriate bearing, such as the bearing 43 for the belt 29 as shown in FIGS. 1 and 2.

With reference primarily to FIGS. 1 and 3, a loader plate 45 is held adjacent the wall structure 15 on its side contacted by a stack of documents or other sheets 17. The loader bar 45 extends across all four of the moving belt sections and is held by the frame in a manner to be movable up and down in a direction parallel with the orientation of the wall structure 15. The purpose of the loader bar 45 is to press the leading edge of the stack of documents 17 down against the conveyor belts for improved frictional engagement of the bottom sheet therewith. The loader bar 45 is not heavy enough to provide the required force itself, so the downward force is aided by a torsion spring 47 which is connected between the side wall 19 of the frame and a torque bar 49 that extends across the width of the machine. The torque bar 49 pushes downward at opposite ends thereof against loader arms 51 and 53 which extend in a direction parallel to the conveyor belts. The loader arms 51 and 53 pass through individual vertical slots (not shown in FIGS. 1 and 3) in the wall structure 15 and terminate in receptacles of the loader bar 45 in a manner to be able to push down on the loader bar 45 no matter how high the stack of sheets 17 on which it rests. The opposite ends of the loader arms 51 and 53 are held by a torque shaft 55 for rotation with respect thereto. The torque shaft 55 is journaled between the side walls 19 and 21 of the document feeder frame. As is explained hereinafter, a mechanism is provided for rotating the torque shaft 55 to overcome the effect of the torsion spring 47 on the loader bar 45 to substantially reduce the downward force applied thereby to the leading edge of the document stack 17. The downward force on the loader bar 45 is removed during those portions of the feeder operation when frictional engagement between the conveyor belts and the bottom sheet is desired to be very low.

Referring primarily to FIG. 3, a pair of follower wheels are provided over each of the conveyor belts to hold a sheet against the conveyor belt after it has been moved under the wall structure 15. Follower wheels 57 and 59, for instance, are positioned at opposite ends of the conveyor belt 25. Similarly, follower wheels 61 and 63 press down against the conveyor belt 27. Follower wheels 65 and 67 press down against the conveyor belt 29, and follower wheels 69 and 71 press against the conveyor belt 31. The follower wheels 59 and 63 are held in a rotatable manner by a roller arm 73 that is loosely held by the torque shaft 55 in a manner that it is free to rotate with respect thereto. Similarly, the follower wheels 67 and 71 are held by a roller arm 75 which is in turn supported in a non-rotatable manner by the torque shaft 55. A roller shaft 75 extending between the side walls 19 and 21 of the machine similarly hold the forward four follower wheels, 57, 61, 65 and 69. Springs 77 and 79 are normally held in tension in a manner to force the follower wheels against their respective conveyor belts.

Figure 4:
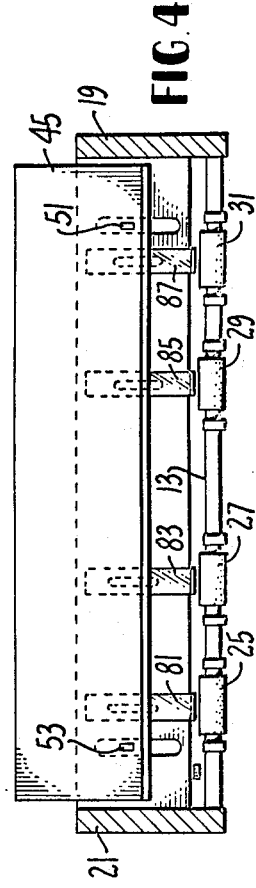
FIG. 4 is a sectional view of the embodiment of FIG. 1 taken across section 4—4 thereof.

With reference primarily to FIGS. 3 and 4, the mechanism for adjusting the gap between the top surface of the conveyor belts and the underside of the wall structure 15 is illustrated. Vertically adjustable gates 81, 83, 85, and 87 are held by the wall structure 15 by thumb screws 89, 91, 93 and 95, respectively. Provision is made for one gate over each conveyor belt. However, in order to prevent the chance of a bottom sheet being removed from a stack being snagged by the gates, only two gates are generally used. The two gates that are selected for use in any given circumstance depends on the width of the sheet material being used. The structure and adjustment of the gates is described hereinafter.

With reference primarily to FIG. 3, an electrical micro-switch 97 is provided immediately above the conveyor plate 13 in a manner to close an electrical circuit when sheet material is positioned thereunder. As is described more fully hereinafter, the switch 97 is one of the control devices for controlling the conveyor belt drive motor 39. The primary function of the switch 97 is to turn off that motor once a sheet has been moved past the switch 97.

Referring primarily to FIGS. 1 and 3, it will be seen that the conveyed sheets are discharged into a tray 99 at the output end of the feeder. The sheets are stacked in the tray 99 in the same order as they were presented in the stack 17 at the output of the document feeder machine. Thus, no reorganization of the sheets is required after being passed through the document feeder illustrated in the drawings. Of course, a more elaborate receiving mechanism than the tray 99 may be provided depending on the particular application. For instance, a deflector could be used that is controlled by the optical reader 23 so that certain documents are segregated from others depending upon the informational content thereof that is detected by the optical reader 23.

Referring primarily to FIG. 2, the operation of the gates, as represented by gate 85 shown therein, permitting only a bottom sheet 101 from the stack 17 to pass thereunder under the influence of the belt 29 may be observed. The gate 85 is adjusted so that its lowest most surface 103 is separated from the top of the conveyor belt 29 by a distance equal to the thickness of one sheet from the stack 17 plus an extra distance such as 0.002 inch. The thickness of normal paper which is likely to be used in conjunction with the document reader and feeder is about 0.005 inch thick. Thus, the gap between the bottom 103 of the gate 85 and the top of the conveyor belt 29 is slightly greater than the thickness of the sheet to be conveyed but less than twice the thickness of the sheets in order to permit only the bottom sheet to pass thereunder. The gate 85 is adjusted to produce this preferable gap dimension by the use of a sample sheet and a folded Mylar piece, as described hereinabove. When the gap is set, the thumbscrew 93 associated with the gate 85 is tightened to hold the gate 85 rigidly to the wall member 15.

Each of the gates is relieved on its leading edge by a notch adjacent its lowest most edge 113. Referring to FIG. 2, the gate 85 includes such a notch 105. The notch 105 preferably has a height that is about equal to the thickness of sheets to be conveyed thereunder so that a sheet 107 that is next to the bottom of the stack 17 will have its leading edge moved into the notch 105 as the bottom sheet 101 is moved under the gate 85. This positions the sheet 107 in a manner to be passed under the gate 85 after the bottom sheet 101 is completely moved thereunder. Without the notch 105, it is likely that the leading edge of the next to the bottom sheet 107 could occasionally curl upwards along the leading surface of the gate 85 and thus would snag on the gate 85 when it is attempted to move the sheet 107 under the gate. Such a snag would require human intervention in order to continue the sheet feeder's operation. This undesirable curling would be especially likely when the stack 17 is extremely high and thus causing downward forces of the loader bar 45 to be very diffuse at the bottom of the stack. The notch 105 is preferably about as deep as it is high and thus for paper of a dimension of 0.005 inch thick, the notch 105 would be about 0.005 inch square. The notch extends completely across each of the gates that are utilized. Each of the gates 81, 83, 85 and 87 is treated at its lower edge to reduce friction with the sheets passing thereunder.

It will be noticed from FIG. 2 that once the lower sheet 101 has been moved by the belt 29 far enough to be engaged by the follower wheel 65, the sheet 101 is then pressed against the moving belt 29 independent of the force applied by the loader bar 45. Thus, the downward force of the loader bar 45 is unnecessary and it may be removed by counteracting the downward force applied thereto by the torsion spring 47 (FIG. 3). Removing the downward force of the loader bar 45 has the advantage that as the bottom sheet 101 is removed from under the lower edge 103 of the gate 85, that the next to the bottom sheet 107 does not follow immediately therebehind but rather will remain behind the gate 85 until the loader bar 45 is again pressed down on the stack 17. The frictional engagement of the bottom sheet of the stack 17 with the conveyor belt is insufficient without the added force provided to the loader bar 45 to move the bottom sheet under the gate 85.

Figure 5:
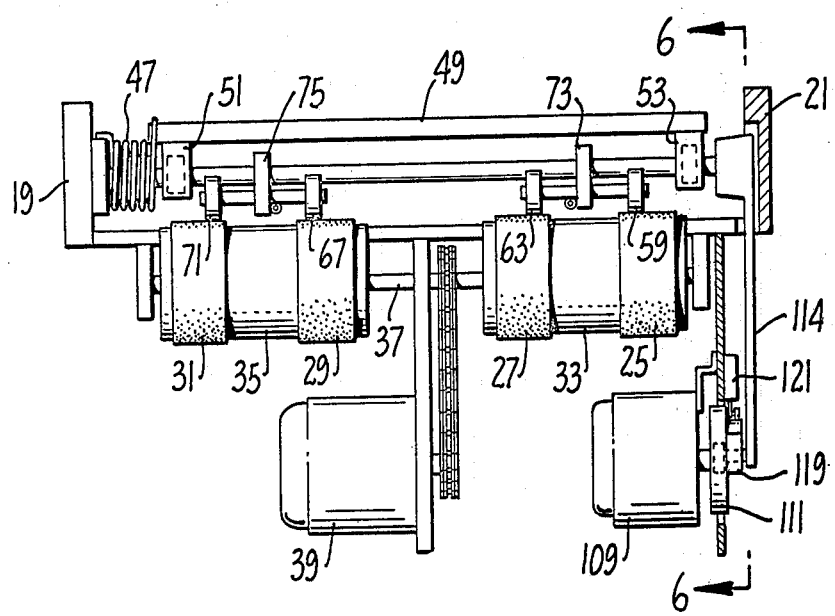
FIG. 5 is a sectional view of the embodiment of FIG. 1 taken across section 5—5 thereof.
Figure 6:
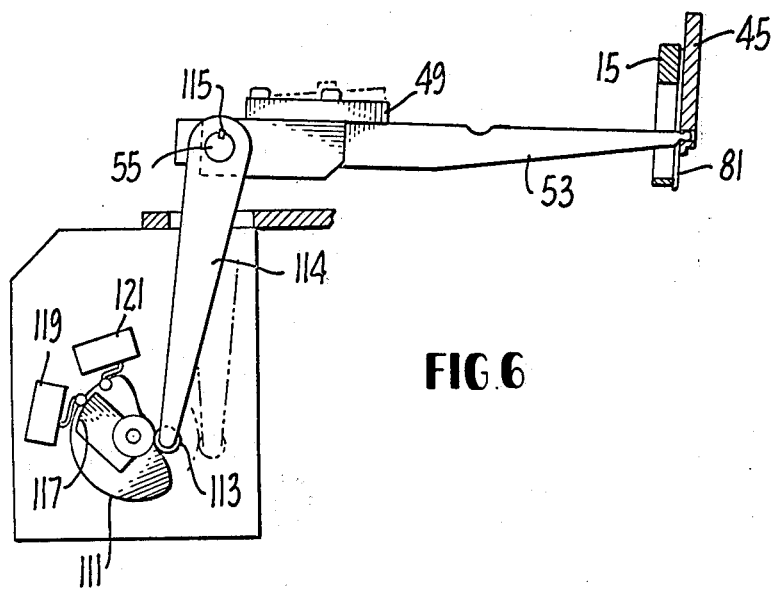
FIG. 6 is an outside side view of the embodiment of FIG. 1 showing the control mechanism therefor.

Referring primarily to FIGS. 5 and 6, the control mechanism for removing the downward force on the loader arms 51 and 53 is shown. A timing electrical motor 109 is held by one side of the document feeder frame below the conveyor plate 13. The timing motor 109 is independent of the belt drive motor 39 but each is preferably of an alternating current synchronous type. The timing motor 109 drives a cam wheel 111 whose outside cam surface is followed by a cam follower roller 113 that is rotatably attached to a cam follower arm 114. The cam follower arm 114 is pinned to the torque shaft 55 by a pin 115. At least one block 116 forms a rigid attachment between the torque shaft 55 and the torque bar 49. Therefore, as the cam wheel 111 is rotated by the timing motor 109, a single cycle occurs whereby the loader bar 45 has initially been pressed down on the stack 17 by the torsion spring 47 and subsequently has had the downward force removed therefrom by action of the cam arm 114. The loader bar 45 preferably maintains contact with a stack of sheets 17 at all times with only an added downward force being controllably applied by the torsion spring 47 during a portion of each single sheet feeding cycle.

The cam wheel 111 is shown in FIG. 6 in its normal position at the beginning of a cycle. During one cycle of operation, a single sheet from the bottom of the stack 17 is passed under the wall structure 15 and onto the conveyor plate 13. The gear ratio between the motor 109 and the cam wheel 111 is appropriately selected so that one revolution of the cam wheel 111 is coincident with the desired cycle period.

Besides the outside cam surface of the cam wheel 111 upon which the cam follower wheel 113 rides, the cam wheel 111 includes a switch actuating cam surface 117 which mechanically actuates a cam sustainer switch 119 and a belt starting switch 121. The cam sustainer switch 119 is held electrically open when contacted by the cam surface 117 while the belt starting switch 121 is held electrically closed when contacted by the cam surface 117.

Figure 7:
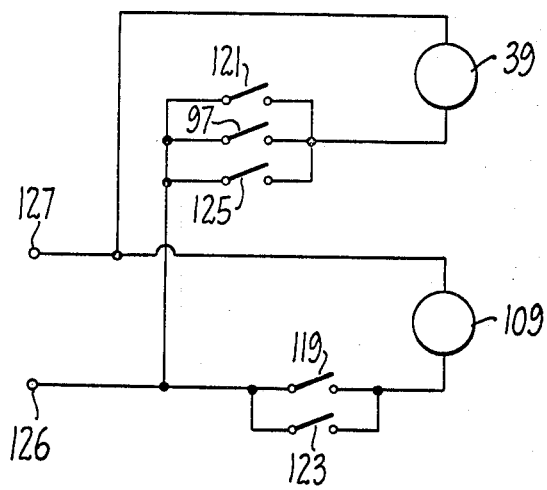
FIG. 7 is a schematic diagram of an electrical system for use in the embodiment of FIG. 1.
Figure 8:
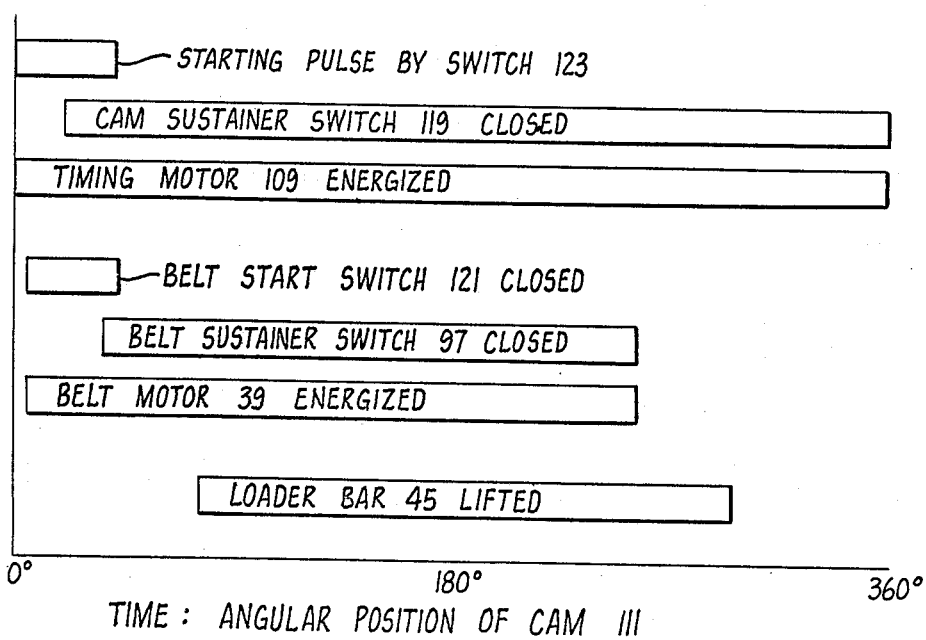
FIG. 8 illustrates in bar graph form the sequential operation of the various components of the embodiment shown in FIGS 1–7 during one cycle of operation thereof.

Referring primarily to FIGS. 7 and 8, the sequence of operation and timing of events for one cycle may be observed. One cycle (one revolution of the cam wheel 111) results in the removal of the bottom sheet from a stack of sheets. At time zero, the cam 111 is in a rest position shown in FIG. 6. A starting switch 123 initiates a cycle of operation by being closed momentarily. This connects the timing motor 109 to power supply terminals 125 and 127. It will be noted from FIG. 6 that at this first instant the cam sustainer switch 119 is held open by contact with the cam surface 117. As the trailing edge of the cam surface 117 disengages the cam sustainer switch 119, the cam sustainer switch 119 is closed until the cam wheel 111 makes a complete revolution and again opens the switch 119. The timing motor 109 is then de-energized until a new starting pulse is applied at the switch 123. This pulse may come from a manual pushbutton switch or, alternatively, may come from some external source such as the document reader 23 after its reading operation has been completed. For continuous operation of the document feeder, the switch 123 is kept closed at all times.

The conveyor belt drive motor 39 is first energized when the belt starting switch 121 is closed. This occurs a very short instant after the cycle is initiated and the cam wheel 111 first starts to rotate. The belt starting switch 121 remains electrically closed, however, only so long as the switch cam surface 117 is in contact therewith, a short portion of the cycle as can best be seen from FIG. 8. The belt motor sustainer switch 97 will be closed, however, to continue electrical energization of the belt drive motor 39, as soon as the leading edge of the bottom sheet of the stack 17 physically contacts the switch 97. If no sheet is fed to the area of the switch 97 before the switch 121 is opened, the motor 39 is stopped. If a sheet is delivered to the switch 97, the belt motor 39 continues to operate in one cycle until the trailing edge of the sheet passes beyond the switch 97. The belt sustainer switch 97 is then caused to be electrically open and disconnect power from the belt drive motor 39. A manual switch 125 is provided in parallel with the switches 97 and 121 for actuation by an operator to remove the last sheet of a stack from the conveyor belts.

Although the various techniques and apparatus of the present invention have been described with respect to a single preferred embodiment of a sheet feeding device, it will be understood that protection of the invention is to be granted within the full scope of the appended claims.

I claim:
1. A mechanism for cooperatively reading optical information from a stack of document sheets and moving them, comprising:
   a first surface area including a solid optically transparent plate oriented substantially horizontally and having a defined edge,
   a movable second surface area with an edge thereof positioned immediately adjacent said defined edge of said transparent plate, said surface also being oriented substantially horizontally as an extension of a top surface of said transparent plate,
   a substantially vertical structure positioned over said second surface area and aligned substantially parallel to said one edge of said transparent plate, thereby to define a position for holding said stack of sheets with an edge on said second surface area but with most of the area of the sheets being held over the transparent plate, said vertical structure being positioned to provide a small gap between its bottom and said second surface area, whereby a single one of said document sheets may pass therethrough,
   means positioned under said transparent plate for reading optical information from the bottom of the stack of documents through the transparent plate,
   said second surface area being movable in a direction away from the transparent plate but at the same time maintaining a continuous document surface outward past said vertical structure from said transparent plate defined edge and,
   means for controllably moving said movable surface away from said one edge of said transparent plate, whereby a stack of document sheets positioned face down adjacent said vertical wall may be optically read and removed from the bottom of the stack one at a time.

2. The mechanism of claim 1, which additionally comprises:
   means positioned adjacent said vertical structure over said movable surface for providing a downward force on said edge of the stack, and
   means controlling operation of the downward force means for urging said stack edge against the movable surface after said optical reading means has observed the optical information on the bottom sheet and until a bottom sheet is only partially removed from the stack through said gap at which time the downward urging is terminated.

3. The mechanism of claim 1 wherein said movable second area comprises at least one flexible endless belt.

4. The mechanism of claim 1 wherein said vertical structure comprises a solid wall.

5. The mechanism of claim 1 wherein said small gap between the bottom of the vertical structure and said second surface area is sized small enough to pass only flexible sheets of paper.

* * * * *